(12) United States Patent
Uhlenbrock et al.

(10) Patent No.: US 11,761,235 B2
(45) Date of Patent: *Sep. 19, 2023

(54) LOCKING DEVICE WITH A GUARD LOCK FOR SAFETY DOORS

(71) Applicant: K.A. Schmersal Holding GmbH & Co. KG, Wuppertal (DE)

(72) Inventors: Christian Uhlenbrock, Schwerte (DE); Thomas Buchwald, Düsseldorf (DE); Yasar Cevic, Hagen (DE); Tobias Gerbracht, Wuppertal (DE)

(73) Assignee: K.A. Schmersal Holding GmbH & Co. KG, Wuppertal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,400

(22) Filed: Apr. 29, 2022

(65) Prior Publication Data

US 2022/0333405 A1 Oct. 20, 2022

Related U.S. Application Data

(63) Continuation of application No. 16/690,083, filed on Nov. 20, 2019, now Pat. No. 11,346,126.

(30) Foreign Application Priority Data

Nov. 23, 2018 (DE) ...................... 10 2018 009 217.9

(51) Int. Cl.
*E05B 17/20* (2006.01)
*E05B 47/02* (2006.01)
(Continued)

(52) U.S. Cl.
CPC .......... *E05B 17/2011* (2013.01); *E05B 11/00* (2013.01); *E05B 15/04* (2013.01);
(Continued)

(58) Field of Classification Search
CPC .......... E05B 11/00; E05B 13/00; E05B 15/04; E05B 15/08; E05B 2015/0406;
(Continued)

(56) References Cited

U.S. PATENT DOCUMENTS

| 4,807,454 A | 2/1989 | Sengupta et al. |
| 7,958,758 B2 | 6/2011 | Trempala et al. |

(Continued)

FOREIGN PATENT DOCUMENTS

| CN | 104612487 A | 5/2015 |
| DE | 9212093 U1 | 1/1994 |

(Continued)

OTHER PUBLICATIONS

Office action dated Oct. 11, 2019 in German Patent Application No. 102018009217.9, all pages. No English translation available.

(Continued)

*Primary Examiner* — Christopher J Boswell
(74) *Attorney, Agent, or Firm* — KILPATRICK TOWNSEND & STOCKTON LLP

(57) ABSTRACT

A locking device having a guard lock for safety doors includes a mechanical actuator which can be fastened on a movable door part and a housing which interacts with the actuator and can be fastened to a door counterpart. The housing includes a receptor to which the actuator can be inserted, and the housing comprises a locking element which is displaceable between an unlocked position, in which the actuator can be released, and a locked position, in which the actuator can be fixed relative to the receptor. The actuator comprises an engagement tongue having an engagement recess for mechanical operative engagement with a head end of a locking element in form of an engagement plunger, the engagement plunger being guided in the housing so as to be longitudinally displaceable in a spring-biased manner in the (Continued)

Figure 1:
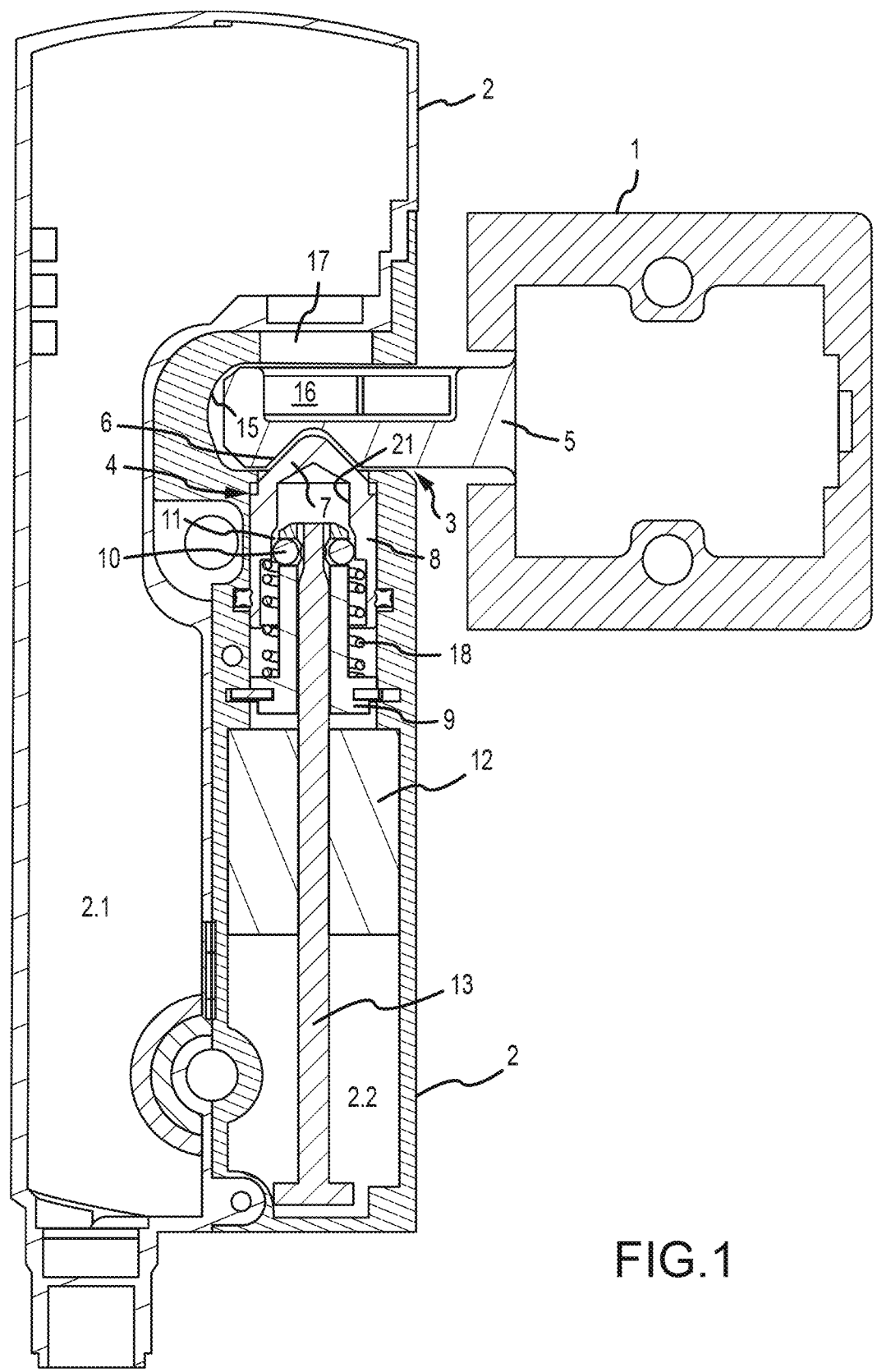

in a plunger longitudinal direction relative to an inner fixed bearing.

10 Claims, 6 Drawing Sheets

(51) Int. Cl.
    *E05B 11/00*     (2006.01)
    *E05B 15/04*     (2006.01)
    *E05B 47/06*     (2006.01)
    *H04W 12/47*     (2021.01)
    *E05B 47/00*     (2006.01)
    *E05B 17/00*     (2006.01)

(52) U.S. Cl.
    CPC .............. *E05B 17/20* (2013.01); *E05B 47/02* (2013.01); *E05B 47/06* (2013.01); *E05B 47/0603* (2013.01); *H04W 12/47* (2021.01); *E05B 2015/0413* (2013.01); *E05B 2017/0095* (2013.01); *E05B 2047/0088* (2013.01)

(58) Field of Classification Search
    CPC ............. E05B 2015/0413; E05B 17/18; E05B 17/185; E05B 17/186; E05B 17/20; E05B 17/2011; E05B 17/22; E05B 2017/0095; E05B 49/00; E05B 47/00; E05B 47/0001; E05B 47/0002; E05B 47/0003; E05B 47/0004; E05B 47/02; E05B 47/06; E05B 47/0603; E05B 2047/0084; E05B 2047/0085; E05B 2047/008; H04W 12/47
    See application file for complete search history.

(56) References Cited

U.S. PATENT DOCUMENTS

| | | | |
|---|---|---|---|
| 8,256,254 B2 | 9/2012 | Bellamy | |
| 8,276,414 B2 | 10/2012 | Luo | |
| 8,276,415 B2 * | 10/2012 | Trempala | E05B 47/063 70/369 |
| 9,041,510 B2 * | 5/2015 | Wolski | G07C 9/00309 340/5.6 |
| 10,822,835 B2 * | 11/2020 | Dewalch | E05B 47/0009 |
| 11,346,126 B2 * | 5/2022 | Uhlenbrock | E05B 47/06 |
| 2011/0277520 A1 | 11/2011 | Nunuparov | |
| 2012/0291501 A1 | 11/2012 | Gentile et al. | |
| 2013/0088024 A1 | 4/2013 | Mackie | |

FOREIGN PATENT DOCUMENTS

| | | |
|---|---|---|
| DE | 102010007388 A1 | 8/2011 |
| DE | 102012018080 A1 | 3/2014 |
| EP | 2104124 A1 | 9/2009 |
| JP | 200857179 A | 3/2008 |
| JP | 201736655 A | 2/2017 |
| RU | 2063505 C1 | 7/1996 |
| RU | 2307401 C2 | 9/2007 |
| WO | 2012-102633 A1 | 8/2012 |

OTHER PUBLICATIONS

European Search Report dated Apr. 21, 2020 in European Patent Application No. 19000529, filed Nov. 20, 2019, 7 pages. No English translation provided.
Office Action dated Dec. 15, 2020 in Chinese Patent Application No. 201911112585.5 filed Nov. 14, 2019, 17 pages.
Office Action for Canadian Application No. 3,062,094 dated May 5, 2021, 4 pages.
Notification of Reasons for Refusal (1$^{st}$ Office Action) for Japanese Appln No. 2019-211242 dated Jun. 4, 2021, all pages.
Second Office Action for Chinese Patent Appln. 201911163597.0 dated Jul. 30, 2021, 11 pages.

* cited by examiner

LOCKING DEVICE WITH A GUARD LOCK FOR SAFETY DOORS

This application is a Continuation of U.S. patent application Ser. No. 16/690,083, filed Nov. 20, 2019, which claims priority to German Patent Application No. 10 2018 009 217.9, filed Nov. 23, 2018, the disclosures of which are incorporated by reference herein in their entirety.

The invention relates to a locking device having a guard lock for safety doors.

Such a device is known from DE 10 2010 007 388 A1. These well-known locking devices are commonly used for safeguarding machines and installations, from which a risk emanates in operation, against unauthorized access. Start-up of such machines should only be allowed when the locking device is locked and, where appropriate, issues a "door closed" signal. In addition, renewed access to the machines should only be permitted when the machine no longer poses any risk. This is achieved by means of a so-called guard lock, i.e. the locking device is not released until there is a stop signal or a similar signal from the machine.

A well-known locking device builds the guard lock using a longitudinally displaceable push rod in a housing or frame part, said push rod being configured to lock a control wheel in a defined state. The locking of the safety door can be effected by an actuator being a key, which is fastened on the door part and is inserted into a receptor at the housing or frame part. The actuator turns the control wheel such that the push rod is able to engage an indentation of the control wheel by the force of a spring. This prevents the key from being removed from the receptor. For controlled release of the key once the machine has stopped, the push rod is moved from an engaging position into a release position.

A disadvantage, however, is the need for a control wheel, which is usually located in a first housing part, while the push rod is located in a second housing part. There is therefore an increased space requirement, with the consequence that the well-known locking device cannot be designed to be compact. Furthermore, the key can only be inserted into the receptor in a correct position. A fail-safe guard lock is then not always guaranteed or may require additional mechanical alignment work at the safety door.

From US 2013/0088024 A1 is known a locking device including a plunger. That plunger can move against a biasing force of a compression spring and has a recess to restrict the movement of the plunger.

It is an object of the invention to provide a locking device having a guard lock, which provides high locking forces, is of simple construction and offers a much greater degree of flexibility.

This object is achieved by the features of Claim 1.

A locking device is provided having a guard lock for a safety door, where the separate actuator comprises a clamping recess as an engagement recess for a locking plunger. The clamping recess and the locking plunger provide a mechanical locking function. The locking plunger is therefore a snap-in plunger. Furthermore, the mechanical catching function provides the possibility of locking. By locking or blocking the locking plunger, the guard locking unit and actuator are mechanically connected to each other. Catch engagement is achieved by a locking plunger driven against biasing force, which in turn runs the actuator into the clamping recess located there.

The guard lock can be achieved via a locking shaft or a locking rod which moves engagement elements, such as, for example, four circumferentially distributed balls, inside the locking plunger, which can take place similar to the ratchet principle. The engagement elements lock the locking plunger towards the locking shaft and thus prevent dipping of the locking plunger. The locking shaft/locking rod can be moved by a bistable solenoid. The position of the locking shaft/locking rod and the associated locking of the locking function can be safely monitored.

In addition to the locking recess, the actuator may contain an electronic identification element, in particular an RFID tag. The position of the RFID tag and thus of the safety device can be reliably detected with an RFID sensor located in the guard lock unit. Consequently a combination of a contactlessly acting sensor (RFID) and a safe-guard lock can be formed to protect a safety device.

The locking device according to the invention then comprises a guard lock unit and an actuator, which has an encodable RFID tag and a locking recess/engagement recess for the locking plunger/engagement plunger. The RFID tag enables to provide the function of a proximity switch with defined behaviour in the event of an error. The locking recess/engagement recess allows the actuator to be continuously inserted at a 180° angle into a head or an actuator slot, which can preferably be designed with openings. The directions of approach are therefore particularly variable and angle-flexible.

Further details of the invention are to be found in the following description and the dependent claims.

The invention is explained in more detail below with reference to the exemplary embodiments shown in the accompanying figures.

Figure 2:
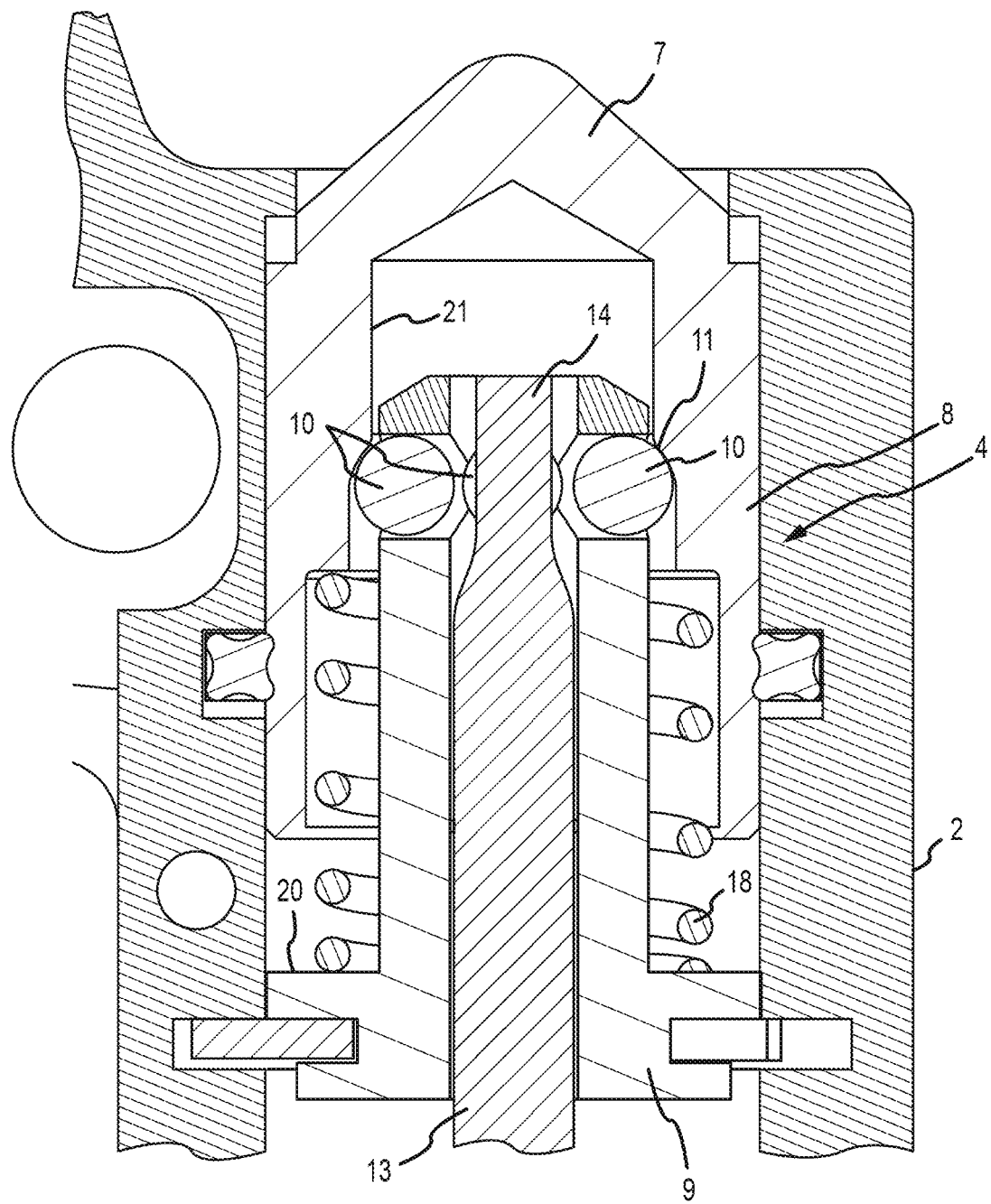
Figure 3:
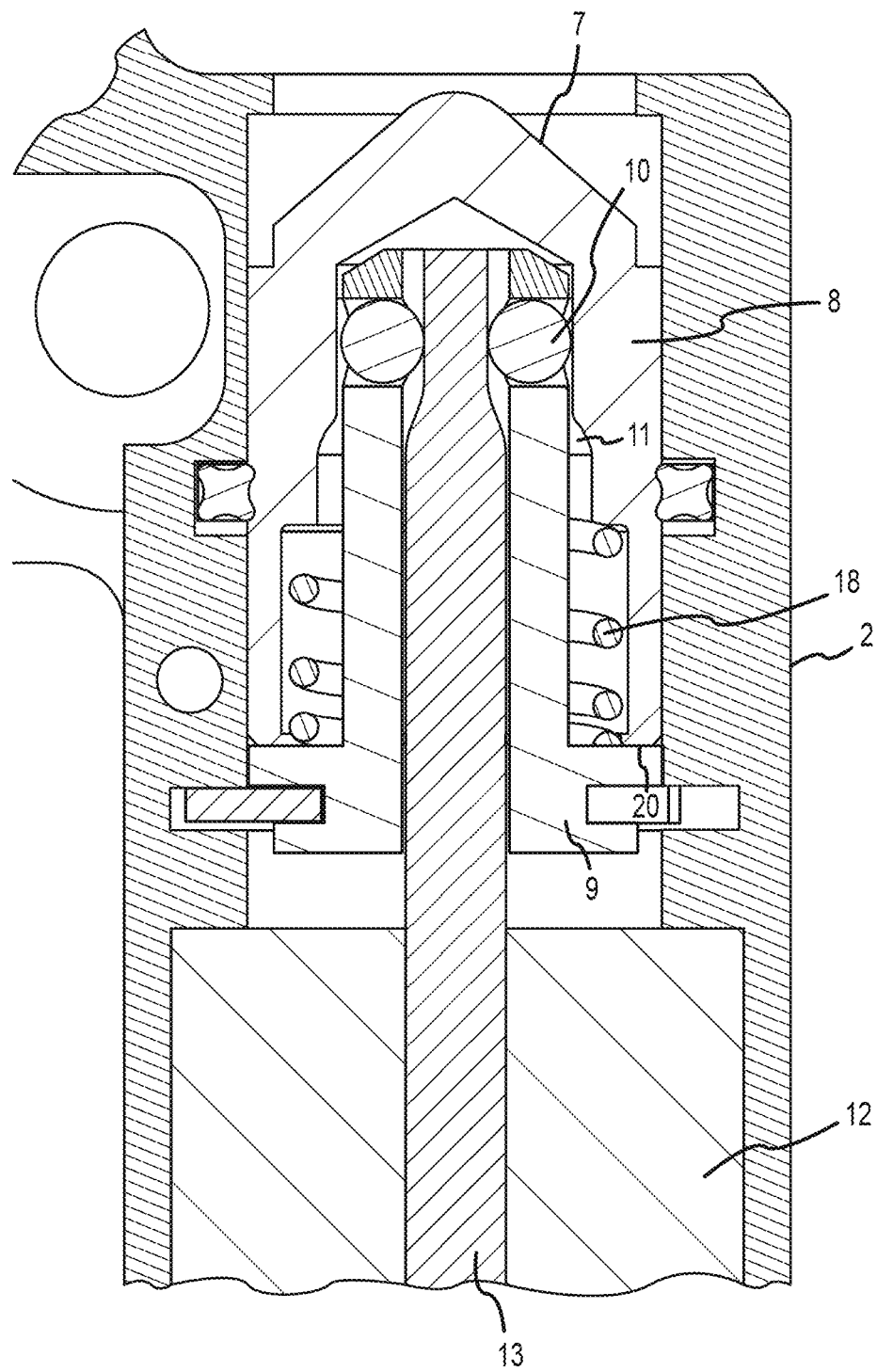
Figure 4:
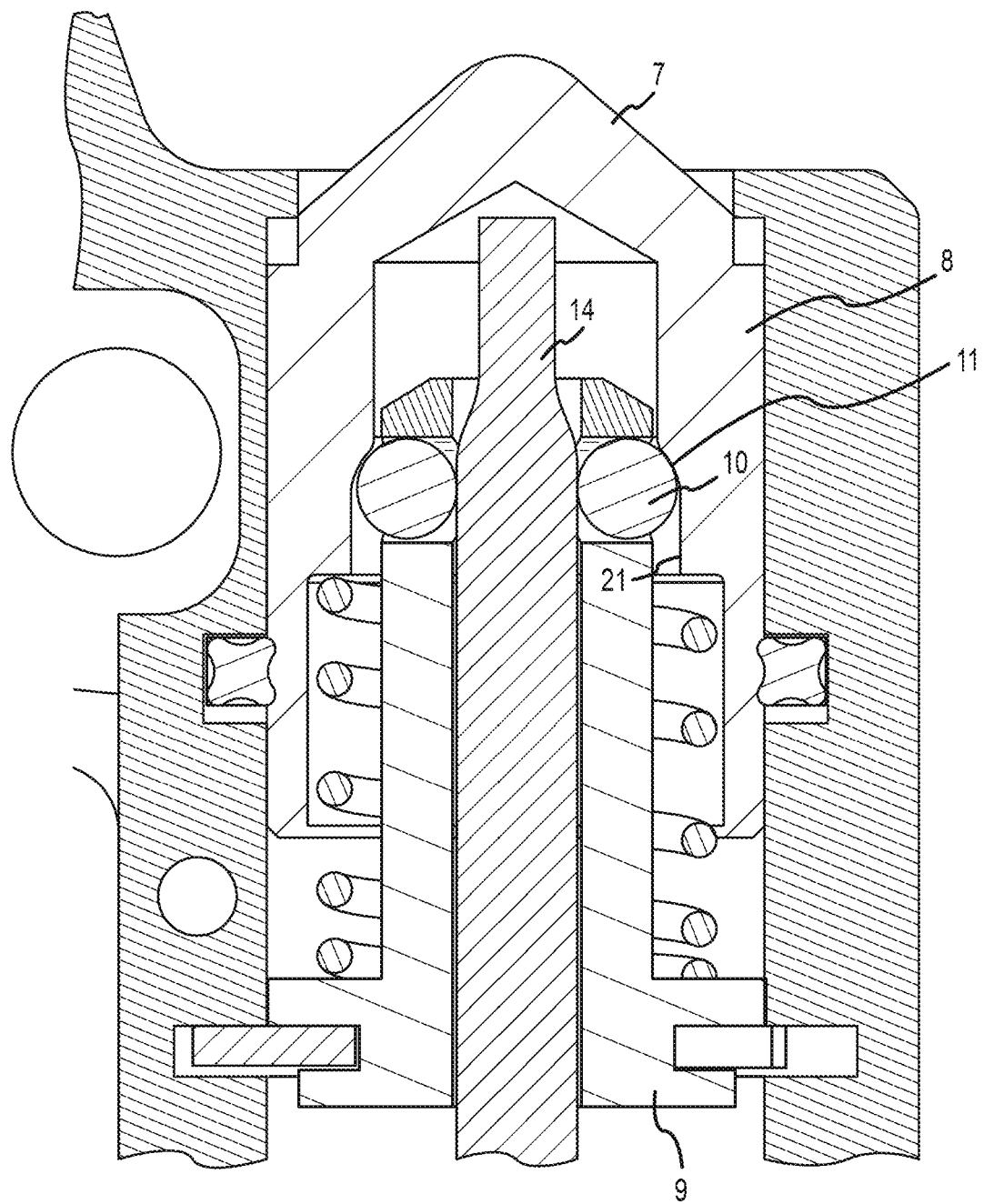
Figure 5:
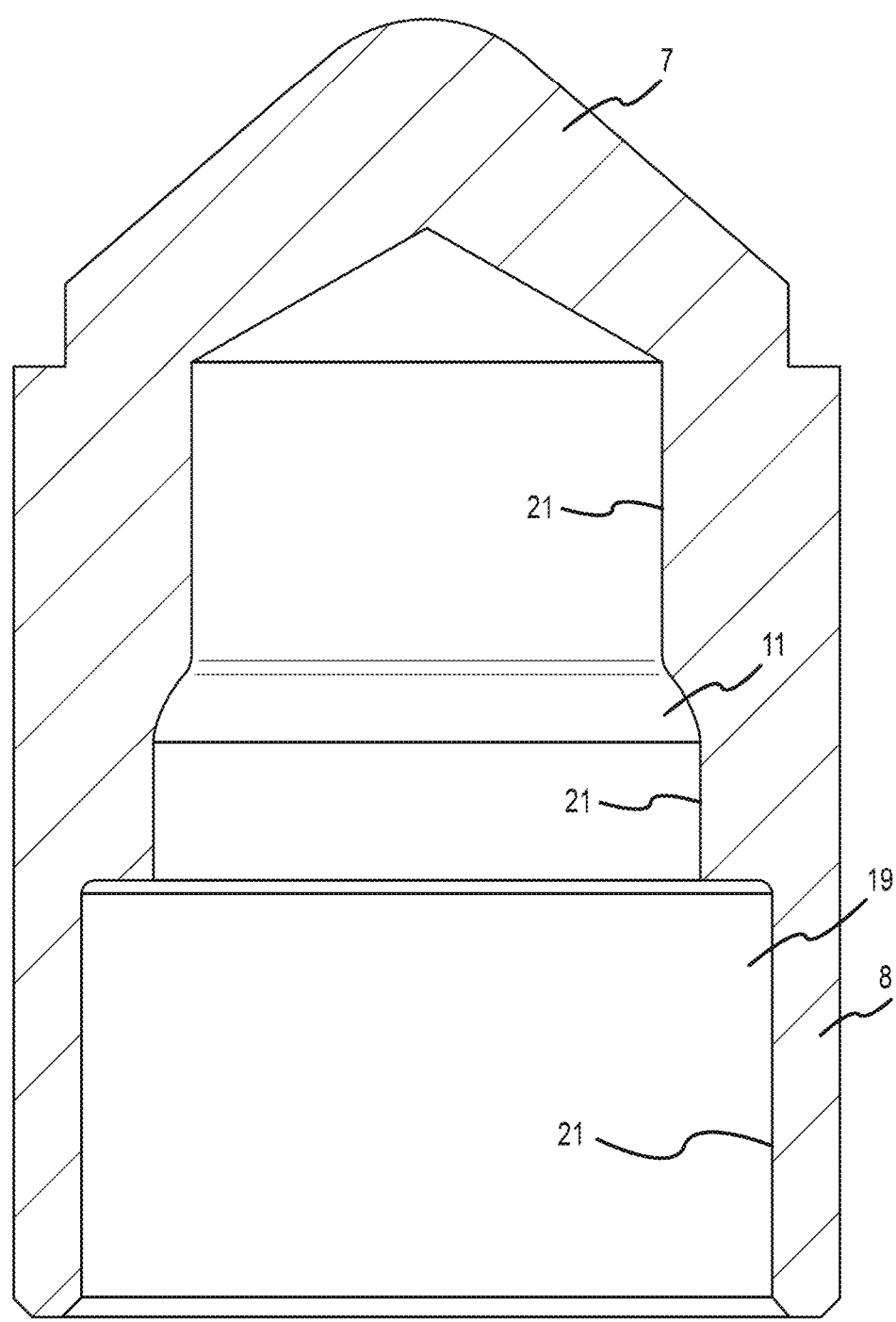
Figure 6:
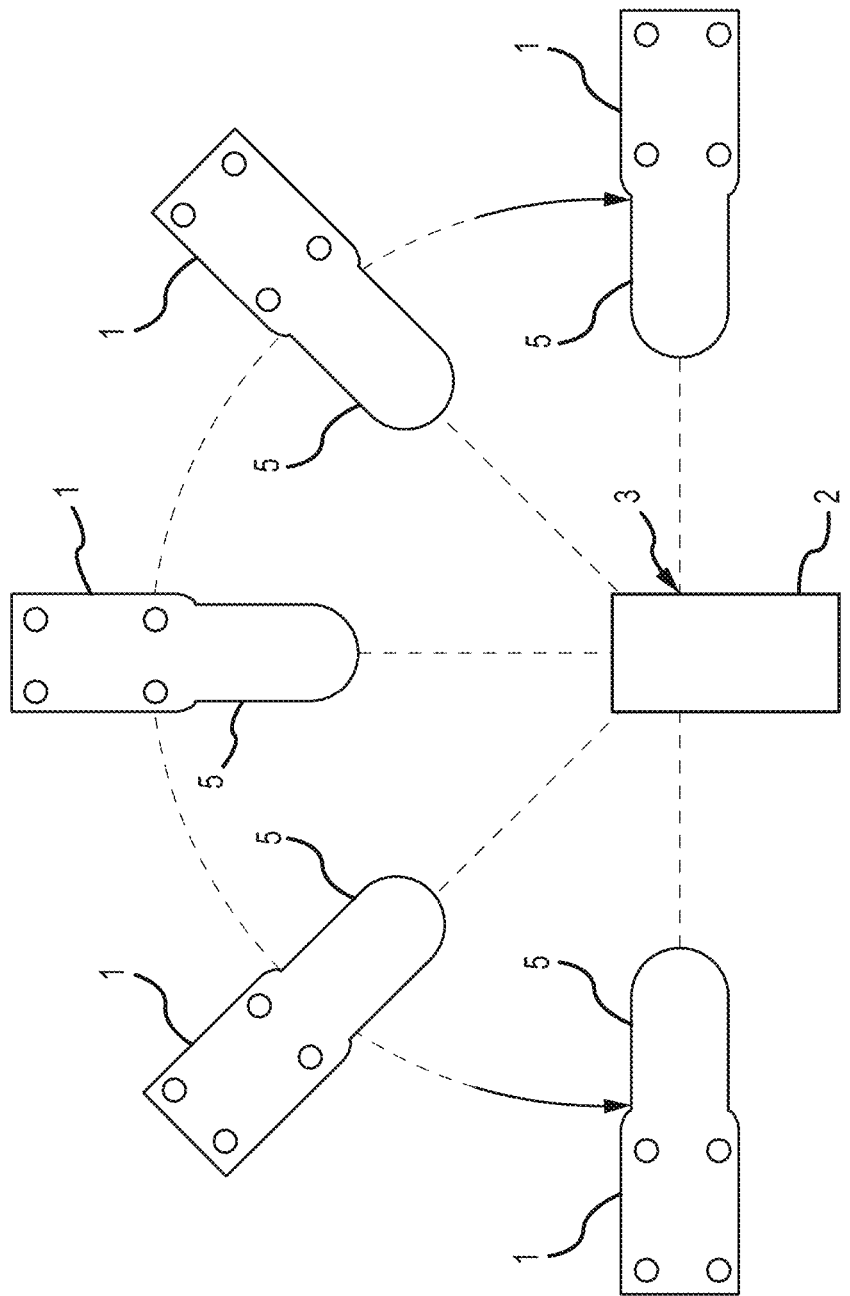

FIG. 1 schematically shows a longitudinal section of a locking device having a guard lock for safety doors with inserted actuator in an unlocked position, FIG. 2 schematically shows in enlarged view a partial longitudinal section of the locking device according to FIG. 1 in the area of an engagement plunger, FIG. 3 schematically shows in enlarged view, a partial longitudinal section of a locking device as FIG. 1 with a spring-loaded engagement plunger, FIG. 4 schematically shows in enlarged view a partial longitudinal section of the locking device according to FIG. 1 with an engagement plunger in the locked position, FIG. 5 schematically shows a longitudinal section of the engagement plunger with its inner contour, FIG. 6 schematically shows the possible directions of approach of an actuator to a housing of the locking device according to the invention.

As is shown in FIG. 1, the invention relates to a locking device having a guard lock for safety doors, comprising a mechanical actuator 1 which can be fastened to a movable door part and a housing 2 which interacts with the actuator 1 and can be fastened to a door counterpart. The housing 2 has a receptor 3 to which the actuator 1 can be fed. FIG. 1 shows the actuator 1 in an inserted position.

The housing 2 comprises a locking element 4 which can be moved between an unlocked position, in which the actuator 1 can be released, and a locked position, in which the actuator 1 can be fixed relative to the receptor 3, as will be described in detail below.

The actuator 1 further comprises an engagement tongue 5 having an engagement recess 6 for mechanical engagement with a head end 7 of a locking element 4 designed as an engagement plunger 8. The engagement plunger 8 is spring-biased and longitudinally displaceable guided in a longitudinal direction of the plunger in the housing 2, as shown in particular in FIG. 2 and FIG. 3. When the engagement tongue 5 of an actuator 1 is pushed in, the engagement plunger 8 can therefore dip into the unlocked position, as shown in FIG. 3, thus enabling the actuator 1 to be inserted in a simple manner. In this case the engagement recess 6 and the head end 7 can centre themselves by suitable shape adaptation.

The engagement plunger 8 is designed as a hollow stud, and is longitudinally displaceable guided in the housing 2 relative to an inner fixed bearing 9 which is shaped like a bushing and carries radially displaceable and fixable engagement elements 10. The engagement elements 10 are used to lock the engagement plunger 8 in the locked position during a defined state. For this purpose, the engagement plunger 8 comprises an inner contour 21 and an engagement stop 11 at the inner contour 21 effective in the longitudinal direction. A biasing spring 18 is supported on the fixed bearing 9 and engages the engagement plunger 8, for which purpose the engagement plunger comprises a support surface 19, as shown in FIG. 5. The fixed bearing 9 on the housing 2 can also be used to determine an insertion travel of the engagement plunger 8, providing the fixed bearing 9 with a bottom surface 20. Further, the fixed bearing 9 can have different positions relative to the housing 2 in the longitudinal direction.

The defined state can be determined by a signal to a lifting device 12 causing the guard lock to move and to hold the engagement elements 10 in a fixed pushed-in or turned position in the locked position.

According to FIG. 1, the lifting device 12 is designed, for example, as a bistable solenoid which moves a locking rod or a locking shaft 13 axially in the longitudinal direction of the plunger between an unlocked position and a locked position of the engagement plunger 8. The engagement elements 10, which are designed, for example, as pins, balls, rollers or setting parts, are radially displaceably moved by means of the axially displaceable locking shaft/locking rod 13. The locking shaft/locking rod 13 comprises a engaging cone 14 which can be brought into engagement with the engagement elements 10, as is shown in FIG. 2 and FIG. 3. FIG. 2 shows the engagement plunger 8 in the unlocked position, as the engaging cone 14 with its small terminal diameter leaves the engagement elements 10 free to move, so that there is no clamping engagement with the stop 11 on the inner contour of the engagement plunger 8. According to FIG. 4, the engaging cone 14 is in engagement with its large terminal diameter with the engagement elements 10 and clamps/presses them against the stop 11, whereby a locking force is exerted on the engagement plunger 8, with the result that the engagement plunger 8 can no longer sink in. The engagement plunger 8 is then in the locked position, as shown in FIG. 4.

The engagement tongue 5 of the actuator 1, which has the engagement recess 6, is preferably of rotationally symmetrical form for operative engagement with a cone-shaped head end 7 of the engagement plunger 8. The engagement recess 6 is a shape-adapted counterpart.

The housing 2 preferably has a housing opening 15, in which the receptor 3 is provided. The receptor 3 can have an insertion/pivot range for the engagement tongue 5 in the unlocked position of at least 180°, as shown in FIG. 6.

The engagement tongue 5 can further be provided with an electronic identification element, in particular an RFID tag 16. The housing 2 can have a sensor device 17 in the area of the receptor 3 for detecting electronic identification elements.

According to the invention, any type of door, flap, cover, hood, sliding door, pivoting door or the like can be regarded as a safety door. According to a further embodiment of the invention, a device for switching an electrical connection, in particular of a safety switch of a safety chain for the operation of a machine, can be provided, wherein for switching the electrical connection, the actuator 1 can be brought into operative connection with a switch head (not shown). Furthermore, an auxiliary release can be provided.

As shown in FIG. 1, the housing 2 can be divided into an electronics housing part 2.1 and a mechanical housing part 2.2. The idea of separating electronics and mechanics makes it possible to follow a modular concept that allows the mechanics to be used for other product families. The housing 2 is therefore advantageously divided into two parts.

The mechanical functioning of the locking device having a guard lock according to the invention is described below.

Starting from a closed safety door (not shown), the actuator 1 with its actuator tongue 5 is located in the engagement recess 6, and the engagement plunger 8 is located with its head end 7 in the engagement recess 6. If this state is reached, and preferably additionally if the RFID tag 16, which can be located in the actuator tongue 5, is detected by a likewise preferably provided sensor device 17 on the housing 2, the guard lock, i.e. the safety door, can be blocked/locked.

Locking is achieved, for example, by moving the locking shaft/locking rod 13 in the direction of the engagement plunger 8. This causes the engagement elements 10, for example balls, which are located in a ball bearing of the fixed bearing 9, to move radially, here, for example, moved outwards. If the engagement elements 10, in particular the balls, for example four circumferentially distributed balls, are pressed outwards in a form-fitting/frictional engagement with the stop at the engagement plunger 8, the engagement plunger 8 cannot sink in any more. Consequently, it is no longer possible to pull out the actuator tongue 5, that also applies to the actuator 1. The safety door is thus blocked/locked.

The locking recess/engagement recess 6 enables the actuator 1 to be inserted steplessly in a 180° angle into the receptor 3, or into an actuator slot, which can be preferably designed in the manner of a mouth. The directions of approach are thus particularly variable and angularly flexible, as is shown in FIG. 6.

The invention now being fully described, it will be apparent to one of ordinary skill in the art that many changes and modifications can be made thereto without departing from the spirit or scope of the appended claims.

The invention claimed is:

1. Locking device having a guard lock for
safety doors, comprising: a mechanical actuator which can be
fastened on a movable door part and
a housing which interacts with the actuator and can be fastened to a door counterpart, which housing comprises:
a receptor to which the actuator can be inserted, and
a locking element which is displaceable between an unlocked position, in which the actuator can be released, and a locked position, in which the actuator can be fixed relative to the receptor,
wherein the actuator comprises an engagement tongue having an engagement recess for mechanical operative catch engagement with a conical head end of the locking element in form of an engagement plunger, the engagement plunger being guided in the housing so as to be longitudinally displaceable in a spring-biased manner in a plunger longitudinal direction relative to an inner fixed bearing, the inner fixed bearing carrying radially displaceable and fixable engagement elements which lock the engagement plunger at its inner contour in the locked position during a defined state, for which purpose the engagement plunger comprises an engagement stop at the inner contour which acts in the longitudinal direction, wherein the engagement recess formed on the engagement tongue of the actuator is rotationally symmetrical for operative engagement with the conical head end of the engagement plunger as counterpart, wherein said engagement recess and said head end are centering themselves by shape adaptation, wherein the receptor comprises an insertion/pivot range for the engagement tongue in the unlocked position of at least 180°, wherein the catch engagement is achieved by the engagement plunger driven against biasing force towards a locking shaft, which in return runs the engagement tongue into the engagement recess located there in a snap-in manner, and wherein the engagement plunger is guard locked towards said locking shaft by said engagement elements preventing a dipping of the engagement plunger against said biasing force towards the locking shaft.

2. Locking device according to claim 1, wherein the defined state is determined by a signal causing the guard lock at a lifting device to move and to hold the engagement elements in a fixing pushed-in or turned position in the locked position.

3. Locking device according to claim 2, wherein the lifting device is a bistable solenoid.

4. Locking device according to claim 1, wherein the engagement elements are pins, balls, rollers or setting parts.

5. Locking device according to claim 1, wherein the engagement elements can be displaced radially by means of an axially displaceable locking shaft or blocking rod, for which purpose the locking shaft or the locking rod has an engaging cone which can be brought into engagement with the engagement elements.

6. Locking device according to claim 1, wherein the housing comprises a housing opening in which the receptor is provided.

7. Locking device according to claim 1, wherein the engagement tongue is provided with an electronic identification element[, in particular] comprising a RFID tag.

8. Locking device according to claim 1, wherein the housing comprises a sensor device for detecting electronic elements in the area of the receptor.

9. Locking device according to claim 1, wherein a door, flap, cover, hood, sliding door, pivoting door or the like is provided as the safety door.

10. Locking device according to claim 1, wherein a device for switching an electrical connection comprising a safety switch of a safety chain for the operation of a machine, is provided, wherein for switching the electrical connection, the actuator can be brought into operative connection with a switch head.

* * * * *